United States Patent
Maehara et al.

(10) Patent No.: US 7,093,210 B2
(45) Date of Patent: Aug. 15, 2006

(54) METHOD OF MANUFACTURING CIRCUIT DEVICE USING A COMMUNICATION NETWORK

(75) Inventors: Eiju Maehara, Kiryu (JP); Junji Sakamoto, Gunma (JP); Noboru Usui, Oota (JP)

(73) Assignee: Sanyo Electric Co., Ltd., Osaka (JP)

(*) Notice: Subject to any disclaimer, the term of this patent is extended or adjusted under 35 U.S.C. 154(b) by 264 days.

(21) Appl. No.: 10/674,897

(22) Filed: Sep. 30, 2003

(65) Prior Publication Data

US 2004/0068703 A1 Apr. 8, 2004

(30) Foreign Application Priority Data

Oct. 2, 2002 (JP) ............................. 2002-290427

(51) Int. Cl.
G06F 17/50 (2006.01)
H03K 17/693 (2006.01)

(52) U.S. Cl. ........................................... 716/4; 716/15

(58) Field of Classification Search .................... 716/1, 716/4, 15
See application file for complete search history.

(56) References Cited

U.S. PATENT DOCUMENTS

| | | | |
|---|---|---|---|
| 6,256,769 B1* | 7/2001 | Tamarkin et al. ............. | 716/12 |
| 6,546,523 B1* | 4/2003 | Boorananut et al. ........... | 716/4 |
| 6,594,799 B1* | 7/2003 | Robertson et al. ............. | 716/1 |
| 6,634,008 B1* | 10/2003 | Dole ............................. | 716/1 |
| 6,886,151 B1* | 4/2005 | Tanaka ......................... | 716/15 |
| 2001/0044667 A1* | 11/2001 | Nakano et al. ............. | 700/100 |
| 2002/0083400 A1* | 6/2002 | Chung et al. .................. | 716/3 |
| 2002/0188910 A1* | 12/2002 | Zizzo ............................. | 716/1 |
| 2003/0088846 A1* | 5/2003 | Yamamoto et al. ........... | 716/14 |

FOREIGN PATENT DOCUMENTS

| | | |
|---|---|---|
| JP | 2001217338 | 8/2001 |
| JP | 2002-93847 | 3/2002 |

* cited by examiner

*Primary Examiner*—A. M. Thompson
*Assistant Examiner*—Magid Y. Dimyan
(74) *Attorney, Agent, or Firm*—Fish & Richardson P.C.

(57) ABSTRACT

A method of manufacturing a System In Package (SIP) or Integrated System in Board (ISB) circuit device in which a plurality of circuit elements are covered with and integrally supported by an insulating resin. A user terminal is connected with an ISB server and an ISB mounting factory through a communication network. Specifications to be satisfied by an ISB circuit device desired by a user, such as an external size and terminal information of the ISB and circuit diagram CAD data, for example, are input through the user terminal and transmitted to the ISB server. The ISB server in turn transmits information concerning the due date and cost of the ISB circuit device and also a reliability evaluation result to the user terminal. The ISB server also generates mask data for manufacturing the ISB circuit device based on the input specifications, and transmits the mask data to the ISB mounting factory. The ISB mounting factory, receiving the manufacturing data from the ISB server, manufactures the ISB circuit device and provides the ISB circuit device to the user.

7 Claims, 18 Drawing Sheets

| ISB SPECIFICATION REQUIREMENT | INPUT CIRCUIT DIAGRAM | INPUT PART LIST | INPUT IC SPECIFICATION | INPUT PASSIVE PART SPECIFICATION | USED CAD INFORMATION | CONFIRM TRANSMISSION CONTENTS |
|---|---|---|---|---|---|---|

1. 1 INPUT ISB EXTERNAL FORM SPECIFICATION

LENGTH [    ] mm × WIDTH [    ] mm × HEIGHT [    ] mm

ATTACH DRAWING FILE
[              ]

1. 2 INPUT ISB TERMINAL SPECIFICATION

TERMINAL SIZE (TERMINAL DIAMETER) [    ] mm

INTER-TERMINAL PITCH
(CENTER-TO-CENTER DISTANCE) [    ] mm

ATTACH DRAWING FILE
[              ]

1. 3 INPUT ISB THERMAL DISCHARGE CHARACTERISTIC

THERMAL RESISTANCE [    ] °C/W 1. 4 INPUT ISB FREQUENCY CHARACTERISTIC

FREQUENCY [    ] GHz

Fig.6

| ISB SPECIFICATION REQUIREMENT | INPUT CIRCUIT DIAGRAM | INPUT PART LIST | INPUT IC SPECIFICATION | INPUT PASSIVE PART SPECIFICATION | USED CAD INFORMATION | CONFIRM TRANSMISSION CONTENTS |

4. 1 EXTERNAL SIZE OF PELLET

NAME OF PELLET [⎯⎯⎯]

☐ WITH STREET WIDTH

LENGTH [⎯⎯⎯] mm × WIDTH [⎯⎯⎯] mm × HEIGHT [⎯⎯⎯] mm

☐ WITHOUT STREET WIDTH

LENGTH [⎯⎯⎯] mm × WIDTH [⎯⎯⎯] mm × HEIGHT [⎯⎯⎯] mm 4. 2 INFORMATION OF WIRE BONDING PAD

NAME OF PELLET [⎯⎯⎯]

EXTERNAL SIZE OF METAL [⎯⎯⎯] mm

PAD OPENING SIZE [⎯⎯⎯] mm

LIST OF PAD COORDINATES

[⎯⎯⎯]

4. 3 INPUT INFORMATION OF BACKSIDE OF PELLET

NAME OF PELLET [⎯⎯⎯]

FLOATING?    ○ YES  ○ NO 4. 4 INPUT OTHER INFORMATION

○ METAL MASK DIAGRAM

○ WIRE BOND DIAGRAM

| ISB SPECIFICATION REQUIREMENT | INPUT CIRCUIT DIAGRAM | INPUT PART LIST | INPUT IC SPECIFICATION | INPUT PASSIVE PART SPECIFICATION | USED CAD INFORMATION | CONFIRM TRANSMISSION CONTENTS |

5. 1 INPUT EXTERNAL SIZE OF PASSIVE PART

NAME OF PASSIVE PART [ ]

LENGTH [ ] mm × WIDTH [ ] mm × HEIGHT [ ] mm 5. 2 INPUT ELECTRODE TERMINAL SPECIFICATION

NAME OF PASSIVE PART [ ]

- o RECTANGULAR ELECTRODE SHAPE
   LENGTH [ ] mm × WIDTH [ ] mm
- o CIRCULAR ELECTRODE SHAPE
   LENGTH [ ] mm × WIDTH [ ] mm 5. 3 INPUT OTHER DIAGRAM INFORMATION
- o DIAGRAM OF EXTERNAL FORM OF PART
- o DIAGRAM OF PART ELECTRODE
- o SPECIFICATION FOR ELECTRICAL CHARACTERISTIC, ETC.
   [ ]

Fig. 10

| ISB SPECIFICATION REQUIREMENT | INPUT CIRCUIT DIAGRAM | INPUT PART LIST | INPUT IC SPECIFICATION | INPUT PASSIVE PART SPECIFICATION | USED CAD INFORMATION | CONFIRM TRANSMISSION CONTENTS |

6. 1 CONFIRMATION OF USEABLE CAD FOR DESIGNING CIRCUIT AND FILE FORMAT

SELECT CAD FOR DESIGNING CIRCUIT

- ○ CR-5000
- ○ OrCAD
- ○ ACCEL
- ○ OTHER

[           ]

6. 2 CONFIRMATION OF USEABLE CAD FOR DESIGNING SUBSTRATE AND FILE FORMAT

SELECT CAD FOR DESIGNING CIRCUIT

- ○ CR-5000
- ○ AutoCAD
- ○ OTHER

[           ]

6. 3 GERBER DATA FORMAT AND OTHERS

| ISB SPECIFICATION REQUIREMENT | INPUT CIRCUIT DIAGRAM | INPUT PART LIST | INPUT IC SPECIFICATION | INPUT PASSIVE PART SPECIFICATION | USED CAD INFORMATION | CONFIRM TRANSMISSION CONTENTS |

CONFIRMATION OF TRANSMISSION CONTENTS

1. ISB SPECIFICATION REQUIREMENT

2. CIRCUIT DIAGRAM FILE

3. PART LIST FILE

4. IC SPECIFICATION/DRAWING FILE/OTHERS

5. PASSIVE PART SPECIFICATION/DRAWING FILE/OTHERS

6. USEABLE CAD FORMAT

PRESS "TRANSMIT" BUTTON IF ABOVE INFORMATION IS CORRECT

TRANSMIT

Fig.12

METHOD OF MANUFACTURING CIRCUIT DEVICE USING A COMMUNICATION NETWORK

BACKGROUND OF THE INVENTION

1. Field of the Invention

The present invention relates to a method of manufacturing a circuit device, and more particularly to a method of manufacturing a circuit device (SIP or ISB) in which a circuit element is covered with and supported by an insulating resin without providing a supporting substrate.

2. Description of the Related Art

Recently, instead of separately packaging each semiconductor element as was previously done, techniques are developed in which a plurality of circuit elements such as an IC, an LSI, and a chip resistor are packaged in one package and supplied as a system. These techniques are known as SIP (System in Package) or ISB (Integrated System in Board). Techniques for providing a system as one package can generally be classified as one of a PCB mounting, system LSI, or ISB technique. PCB mounting suffers problems in that it is difficult to reduce the size and weight and to obtain high performance. Although a system LSI has advantages that it is possible to reduce the size and weight, to obtain high performance, and to reduce power consumption, the system LSI suffers problems in that changes to the specification are difficult and development of a new system is very expensive. On the other hand, the ISB has the advantages of the system LSI in that it is possible to reduce size, weight, and power consumption and, in addition, has an advantage that it is possible to quickly respond to a change in the specification. More specifically, while in a system LSI, an SOC chip in which a plurality of functions are integrated is formed and mounted on a substrate, in an ISB, a system is constructed by connecting a plurality of chips by a multi-layer wiring. Thus, it is possible to flexibly respond to changes in specifications by changing the chip and wirings in an ISB.

FIGS. 16 and 17 show respectively a perspective view and a side view of an ISB circuit device. In an ISB circuit device, unlike in a PCB mounting, a plurality of circuit elements are embedded into an insulating resin package and there is no supporting substrate such as a print substrate in the PCB mounting. A circuit element such as an LSI bare chip 52A, a chip CR 52B, and a Tr bare chip 52C are fixed onto a conductive path 51 such as a copper pattern using a conductive paste 55B and are covered and integrally supported by an insulating resin 50. In other words, the insulating resin 50 functions to cover the plurality of circuit elements, and, at the same time, as a supporting member of the circuit elements. The LSI bare chip 52A or the like are wire-bonded by a gold line bonding 55A. The conductive path 51 is exposed on the backside of the ISB circuit device and a solder ball 53 is connected.

FIGS. 18–21 show a method for manufacturing an ISB circuit device. As shown in FIG. 18, a sheet-shaped conductive foil 60 is prepared and a photo resist (etching-resistive mask) PR is formed on the conductive foil 60, and the photo resist PR is patterned so that the conductive foil 60 exposes in regions other than a region which forms the conductive path 51.

Next, as shown in FIG. 19, the conductive foil 60 is etched using the photo resist PR as a mask to form a separation channel 61. The thickness of the conductive foil 60 can be set in a range from 10 μm to 300 μm (for example, 70 μm) and the depth of the separation channel 61 can be set to, for example, 50 μm. As the etching, for example, a wet etching process, a dry etching process, and evaporation by laser can be employed.

Then, as shown in FIG. 20, circuit elements such as the LSI 52A and chip CR 52B are mounted on the conductive foil 60 on which the separation channel 61 is formed. The bare LSI chip 52A is fixed by a conductive paste 55B and the chip CR is fixed by a soldering member such as solder or by a conductive paste. The terminal of the LSI 52A is wired by a metal fine line 55A.

Next, as shown in FIG. 21, an insulating resin 50 is attached to the conductive foil 60 and the separation channel 61. The insulating resin 50 is an epoxy resin, a polyimide resin, or the like, and is formed through transfer molding or injection molding. The thickness of the insulating resin 50 covering the surface of the conductive foil 60 is adjusted, for example, such that approximately 100 μm from the top portion of the circuit element is covered. Then, the backside surface of the conductive foil 60 is chemically or physically removed and separated as the conductive path 51. In FIG. 21, a surface exposed by the removal is shown by a dotted line. For example, the conductive path 51 is separated by grinding the backside surface by approximately 30 μm using an abrasive or a grinder. Finally, a solder ball is connected to the exposed conductive path 51 to complete the ISB circuit device. The above manufacturing steps shown in FIGS. 18 to 21 are automated, so that when mask data for forming a mask pattern shown in FIG. 18, part arrangement data, and wire bonding data are provided, the ISB circuit device can be manufactured automatically.

FIGS. 22A, 22B and 22C show another ISB circuit device 70. As shown in FIG. 22A, in this circuit, a current mirror circuit made of transistor chips TR1 and TR2 and a differential circuit made of transistor chips TR3 and TR4 are integrated. Four transistor chips TR1–TR4 are bonded by a Au fine line. As shown in FIG. 22C, a die pad 71 on which a Z film (a film having a larger growth in the thickness direction than in the planar direction) 74 is formed, a bonding pad 72 on which a Z film 74 is formed, a die pad, and a bonding pad are electrically connected by a wiring 73. As the wiring 73, a rolled copper foil may be used. Because the rolled copper foil is resistive against repetition of bending by heat, the rolled copper foil inhibits disconnection of the wiring.

Additional explanation can be found in Japanese Patent Laid-Open Publications Nos. 2001-217338 and 2002-93847.

As described above, ISB circuit devices have various features. Conventionally, a user who wishes to have such an ISB circuit device, such as, for example, a device manufacturer, which as used herein refers not just to manufacturers of electronic goods in their final form, but also to intermediate manufacturers and assembler of components, provides an ISB mounting manufacturer with a specification document or the like which describes the specifications to be satisfied by a desirable ISB. The ISB mounting manufacturer then performs circuit design, pattern design and also mask design based on the specifications, so that an ISB circuit device is manufactured according to the above steps shown in FIGS. 18 to 21. However, there is a demand for a method in which a user can obtain an ISB circuit device more promptly and effectively. Especially, a device manufacturer, who manufactures a product having a short life cycle, has a strong demand for such a method.

SUMMARY OF THE INVENTION

The present invention provides a method in which a circuit device can be manufactured and provided to a user simply and promptly.

In accordance with the present invention, there is provided a method of manufacturing a circuit device, in which an IC and a passive part are covered with and supported by an insulating resin, using a terminal and a server which are connected to each other via a communication network, the method comprising a condition inputting step for inputting conditions to be satisfied by the circuit device (specifications for the circuit device) through the terminal and transmitting the conditions from the terminal to the server, a manufacturing data generating step for receiving the conditions and generating manufacturing data for manufacturing the circuit device based on the conditions at the server, and a manufacturing step for manufacturing the circuit device based on the manufacturing data.

Thus, a circuit device can be manufactured automatically and then provided to a user just by inputting conditions (specifications) through a terminal.

In accordance with one aspect of the present invention, the above method comprises an evaluating step for evaluating, at the server, reliability of a circuit device to be manufactured based on the conditions when the conditions are received by the server and transmitting an evaluation result to the terminal. According to the present invention, because the server includes a circuit diagram, a pattern diagram, and mask data, which are necessary for manufacturing a circuit device, it is possible for the server to perform simulation using this data for evaluating the reliability of the device. By transmitting to the terminal the results of reliability evaluation, the user in turn can obtain and consider the reliability evaluation result of a desired circuit device before actually obtaining the circuit device. More specifically, the reliability evaluation is performed concerning the operation characteristics of a circuit device, such as the thermal discharge characteristics and the frequency characteristics.

The above conditions may include at least an external size, a terminal size, a circuit diagram, IC specification data, and passive part specification data of the circuit device. In the above manufacturing data generating step, a pattern design processing and a mask design processing may be performed based on the conditions for generating, as the manufacturing data, at least mask data, part arrangement data, and wire bonding coordinate data. The pattern design from a circuit diagram and further the mask design can be performed using a known rule or processing program. The pattern design and mask design may be performed while referring to basic CAD data which is stored in the database of the server as necessary. The mask data may be converted into photo data, for example, in the subsequent circuit device manufacturing step. Based on the photo data, a photo resist is generated for forming the conductive pattern of the circuit device.

Further, in the above condition inputting step, the conditions may be input through a web page which is created by the server and displayed on the terminal. With the use of a web page form, it is possible for a user to easily input the conditions and transmit the input conditions to the server. A web page includes a page described in XML, in addition to a page described in HTML.

In accordance with a further aspect of the present invention, there is provided a method of manufacturing a circuit device, in which an IC and a passive part are covered with and supported by an insulating resin, using a terminal and a server which are connected to each other via a communication network, the method comprising, at the server side, the steps of receiving conditions to be satisfied by the circuit device from the terminal, generating manufacturing data for manufacturing the circuit device based on the conditions, and transmitting the manufacturing data to a circuit device manufacturing facility, wherein the circuit device is manufactured using the manufacturing data in the circuit device manufacturing facility.

The present invention will be understood more clearly with reference to the following embodiments. It should be noted, however, that the following embodiments are only illustrative and are not intended to limit the scope of the present invention.

BRIEF DESCRIPTION OF THE DRAWINGS

These and other objects of the invention will be explained in the description below, in connection with the accompanying drawings, in which:

FIG. 6 is a diagram for explaining a screen displayed on a user terminal (part 1);

FIG. 9 is a diagram for explaining a screen displayed on a user terminal (part 4);

FIG. 10 is a diagram for explaining a screen displayed on a user terminal (part 5);

FIG. 11 is a diagram for explaining a screen displayed on a user terminal (part 6);

FIG. 12 is a diagram for explaining a screen displayed on a user terminal (part 7);

DETAILED DESCRIPTION OF THE PREFERRED EMBODIMENT

Figure 16:
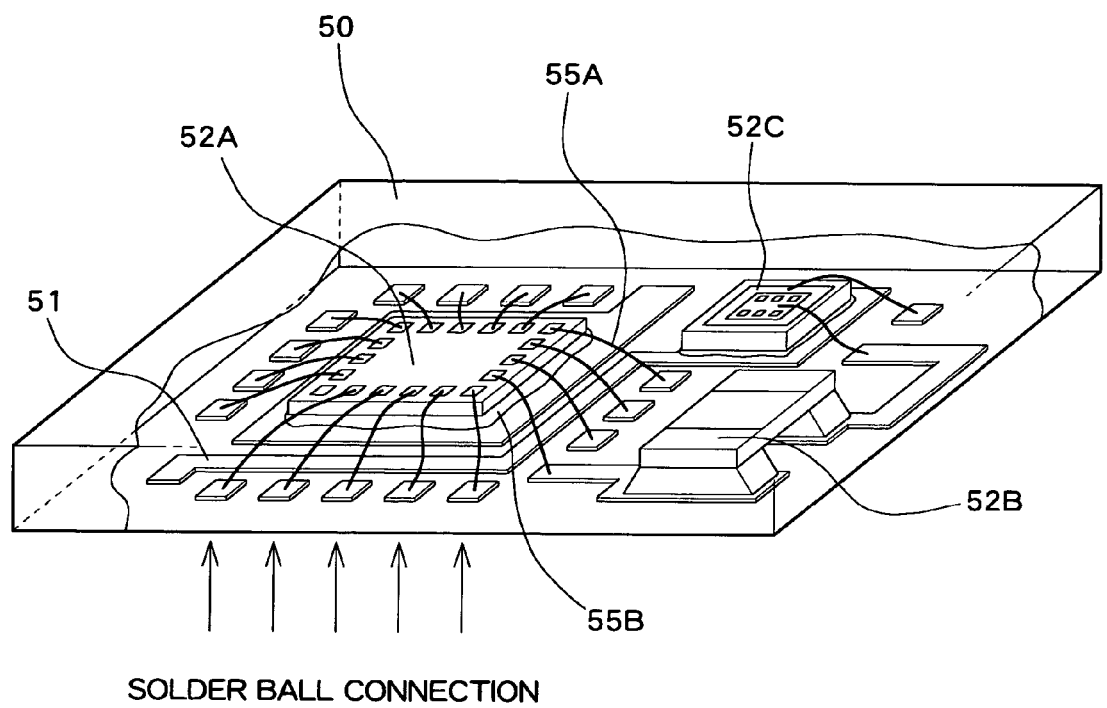
FIG. 16 is a perspective view of an ISB circuit device (of a related art)
Figure 17:
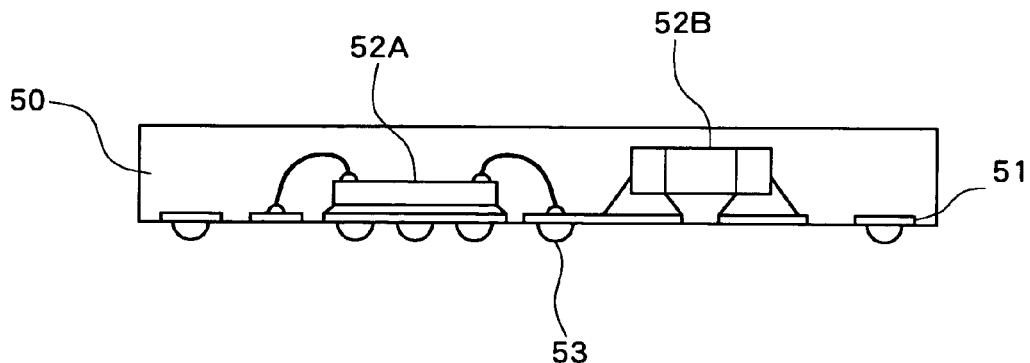
FIG. 17 is a side view of an ISB circuit device (of a related art)
Figure 18:
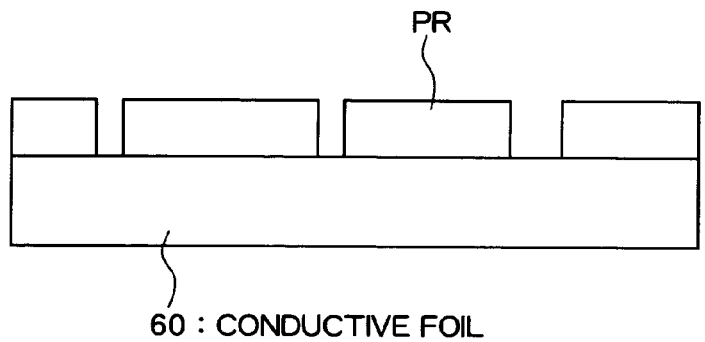
FIG. 18 is an explanatory view (part 1) showing an ISB manufacturing step.
Figure 19:
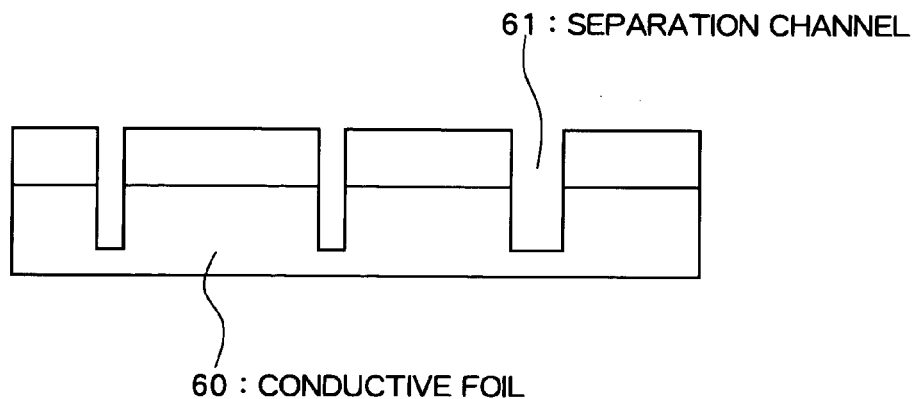
FIG. 19 is an explanatory view (part 2) showing an ISB manufacturing step.
Figure 20:
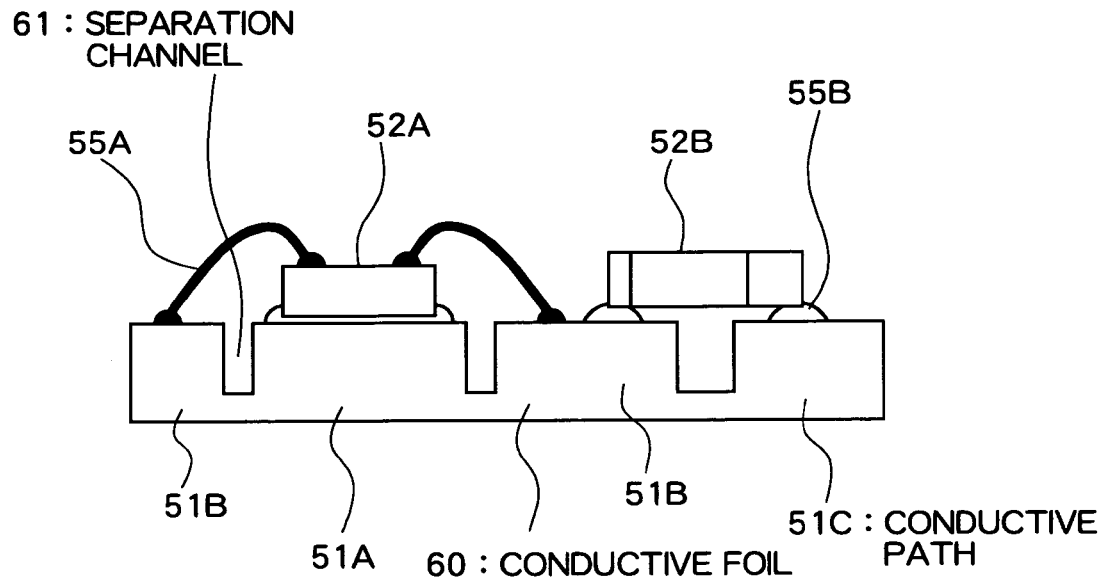
FIG. 20 is an explanatory view (part 3) showing an ISB manufacturing step.
Figure 21:
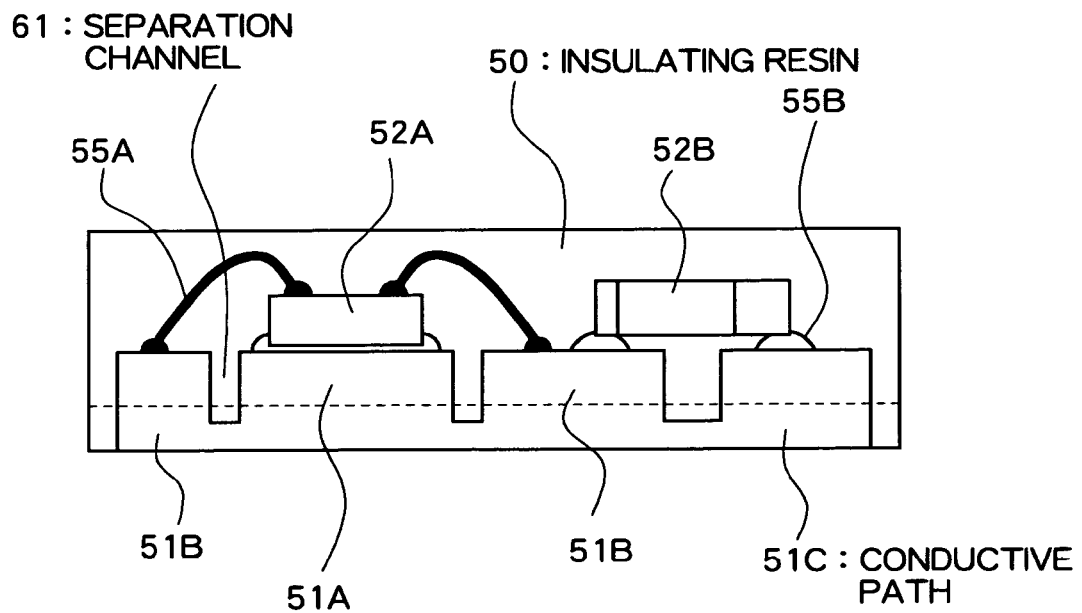
FIG. 21 is an explanatory view (part 4) showing an ISB manufacturing step.
Figure 22A:
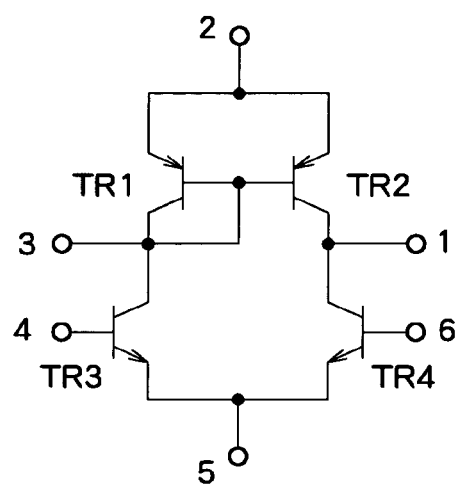
FIGS. 22A, 22B, and 22C are explanatory diagrams of another ISB.
Figure 22B:
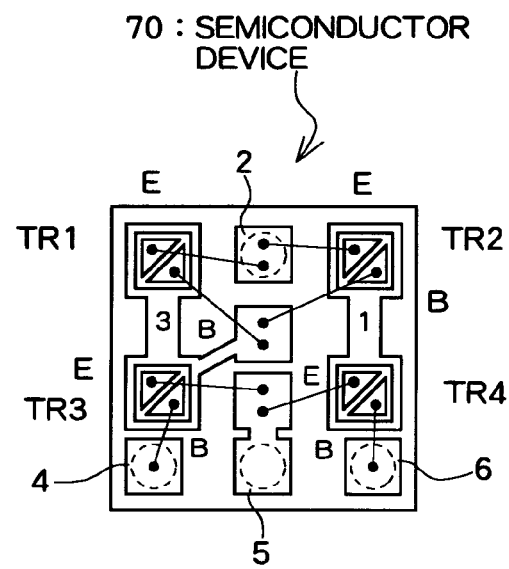
Figure 22C:
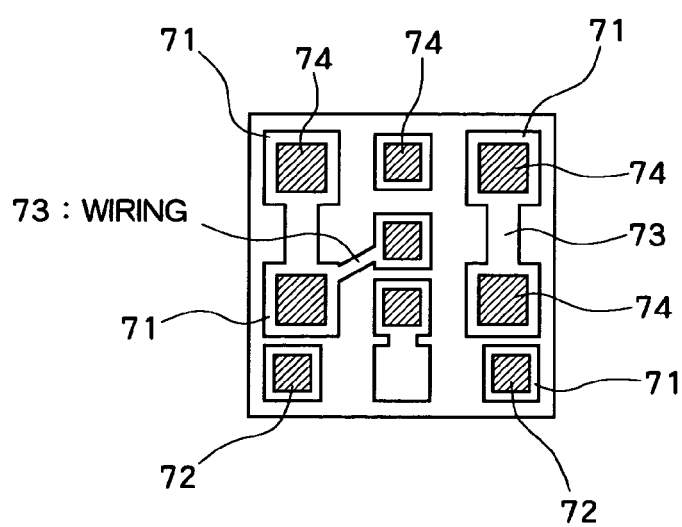

With reference to the accompanying drawings, a preferred embodiment of the present invention will be described in further detail using an ISB circuit device as an example. An ISB circuit device refers to a circuit device in which a plurality of circuit elements (an active part and a passive part) are covered with and supported by an insulating resin without providing a supporting substrate, as shown in FIGS. 16 and 17, and includes an SIP in a wider sense.

Figure 1:
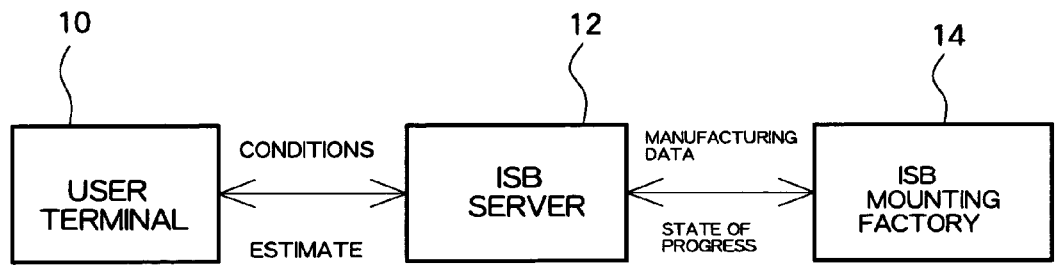
FIG. 1 is a conceptual diagram of an ISB circuit device manufacturing system of the present invention.

FIG. 1 shows a configuration of an ISB circuit device manufacturing system according to an embodiment of the present invention. A user terminal 10, which is used by a device manufacturer such as, a mobile telephone manufacturer, a home electric appliances manufacturer, or the like, and an ISB server 12 are connected with each other via a communication network such as the Internet. Further, the ISB server 12 and an ISB mounting factory 14 are also connected with each other via a communication network. A dedicated line may be used for connection between the ISB server 12 and the ISB mounting factory 14. Although it is preferable that a public line is used for connection between the user terminal 10 and the ISB server 12 such that a plurality of user terminals can benefit the present system, a dedicated line may instead be used.

The user terminal 10 is a personal computer, a work station, or a dedicated terminal, which is provided with a network interface. Specifications to be satisfied by an ISB circuit device desired by a user are input to the user terminal 10, which then transmits the input specifications to the ISB server 12. The specifications to be satisfied by an ISB circuit device include the external size and terminal shape of the ISB, the IC specification, the passive part specification, circuit diagram CAD data, and so on. The user can send this data in an arbitrary format from the user terminal 10 to the ISB server 12. According to the present embodiment, however, assuming that the system is connected via the Internet, the specifications are input by entering the data through a web page created by the ISB server 12 and are then transmitted to the ISB server 12. For this purpose, appropriate browser software should be installed on the user terminal 10.

The ISB sever 12 receives the specifications transmitted from the user terminal 10, generates manufacturing data based on the specifications, and sends the manufacturing data to the ISB mounting factory 14. The manufacturing data includes mask data, part arrangement data, and wire bonding data, which are necessary for performing the above described ISB manufacturing steps. Receiving the data and converting the mask data into photo data for creating a photo resist PR, the ISB mounting factory 14 sequentially carries out each of the steps shown in FIGS. 18 to 21. More specifically, a mask is formed based on the photo data, and etching is performed so as to form a conductive channel pattern. Then, circuit elements are fixed and connected on the conductive channel using wire bonding. After covering the conductive pattern, the circuit elements or the like with an insulating resin, the backside surface processing is performed, to thereby manufacture an ISB.

In FIG. 1, the data flow from the ISB server 12 to the user terminal and the data flow from the ISB mounting factory 14 to the ISB server 12 shows transmission of ISB estimate data created by the ISB server 12 to the user terminal and transmission of data concerning the progress of manufacturing in the ISB manufacturing factory 14 to the ISB server 12, respectively. The estimate data includes not only data concerning the due date and the cost but also the reliability evaluation result of an ISB circuit to be manufactured according to the specifications transmitted from the user terminal 10. The progress data is further transmitted from the ISB server 12 to the user terminal 10.

Figure 2:
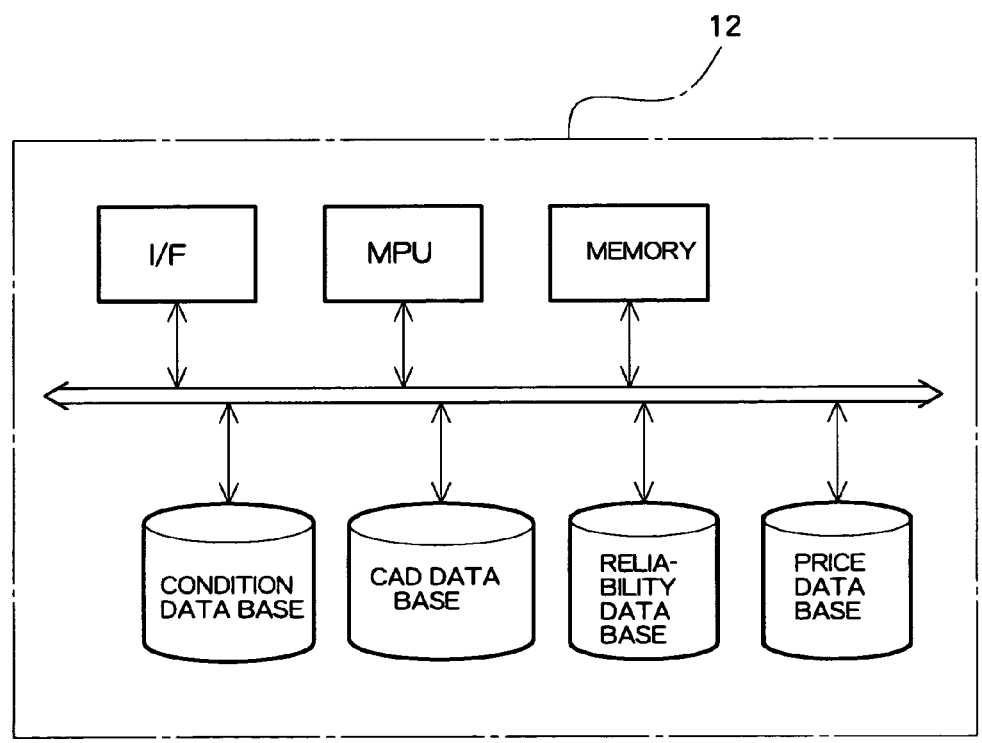
FIG. 2 is a functional block diagram of the ISB server of FIG. 1.

FIG. 2 shows a functional block diagram of the ISB server 12. The ISB server 12 has a configuration similar to a known server computer. More specifically, the ISB server 12 comprises an interface I/F, an MPU, a memory such as an ROM or RAM, and databases DB. The databases DB include a specification data DB, a CAD data DB, a reliability data DB, and a price data DB.

The specification data DB is a database for storing the specifications input through the user terminal 10. More specifically, the ISB external size data and terminal shape, the external form specification and characteristics specification of a passive part, the external form specification and a pad diagram of an active part such as an IC (LSI), the pad coordinate data, the wire bonding diagram, the circuit diagram CAD data, or the like, are stored in the specification data DB.

The CAD data DB for storing CAD data stores CAD data of a plurality of circuit diagrams, pattern data of a passive part, pattern data of an active part such as an IC, material information data concerning wires and bonding adhesive materials, data concerning the external form and the backside terminal, or the like. The MPU of the ISB server 12 performs pattern design and mask design based on the input specifications, while referring to these CAD data.

The reliability data DB stores data of various reliability test results conducted concerning ISB circuit devices which were manufactured in the past. The reliability data is used for evaluating the reliability of an ISB circuit device to be manufactured according to the specifications received from the user terminal. Specifically, when an ISB to be manufactured based on the received specifications is the same as an ISB which was manufactured in the past and evaluated for reliability, the reliability test result data for the corresponding ISB is sent to the user terminal 10. When an ISB to be manufactured according to the received specifications does not match any ISB manufactured in the past, a reliability test result is calculated based on the similarity between the existing ISBs stored in the database and an ISB to be newly manufactured, and the result is transmitted to the user terminal 10.

The price data DB stores price data of the active and passive parts and other price data, and is used for estimation of the price of an ISB to be manufactured based on the received specifications. It is possible to allow a part manufacturer to access the network using a terminal and pre-register the price data of parts in the price data DB. Registrations of a manufacturer name and characteristic data along with the price of parts is also possible, so that this data can all be provided to the user terminal 10. The parts data may also be used as sample data when entering specifications through the user terminal 10.

Figure 3:
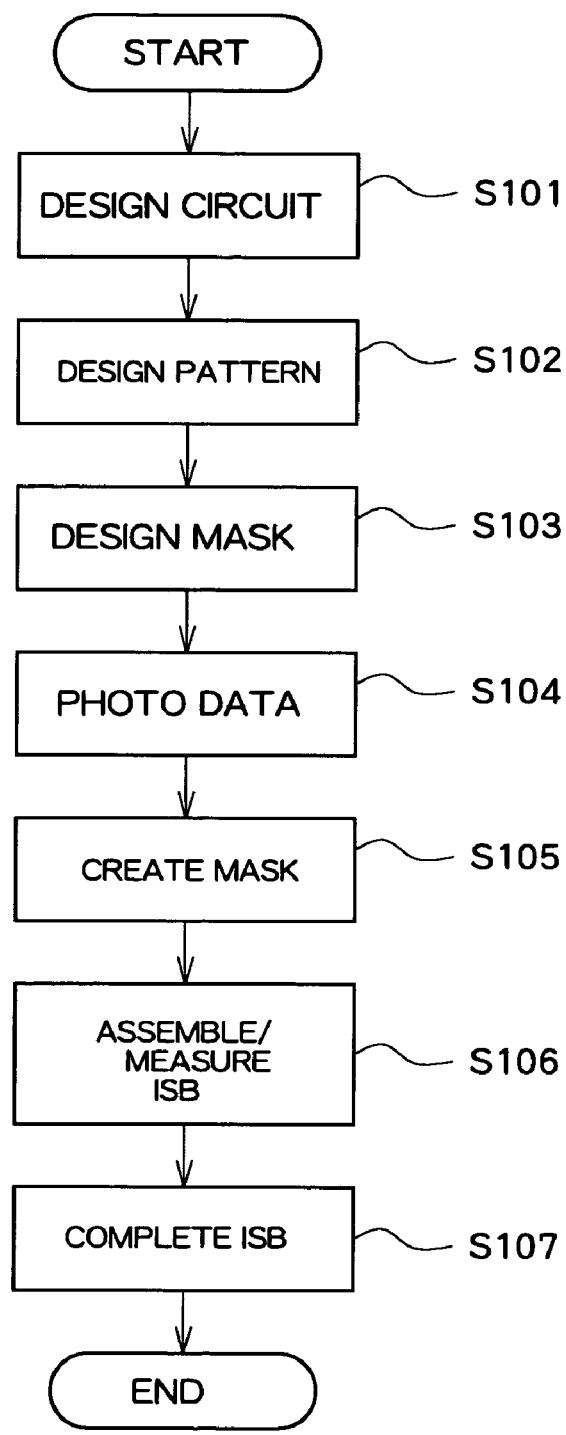
FIG. 3 is a flowchart for manufacturing an ISB circuit device.

FIG. 3 shows a typical manufacturing flowchart of an ISB circuit device. First, circuit design is performed (S101), and a pattern is designed based on the circuit diagram (S102). Then, a mask is designed based on the designed pattern (S103), and the mask data is converted into photo data (S104). After data conversion to photo data, as already described, a photo resist mask is created (S105), and the steps shown in FIGS. 18 to 21 are sequentially performed. More specifically, a step of forming a conductive channel pattern using the mask, a step of fixing circuit elements on the conductive channel, a step of wiring, a step of covering and supporting the circuit elements with and by an insulating resin, and a step of backside surface processing, are sequentially performed to thereby assemble an ISB circuit device, regarding which the reliability is measured (S106). When the reliability test result proves OK, the ISB is finally completed and delivered to a user (S107).

According to the present embodiment, the processes in steps S101 to S107 are automated so as to make the ISB manufacturing more efficient. Specifically, the process in step S101 is performed by the user terminal 10 and the ISB server 12, the processes in steps S102 and S103 are performed by the ISB server 12, and the processes in steps 104 and the following steps are performed by the ISB mounting factory 14. Alternatively, because the pattern design from the circuit diagram data, and the mask design from the pattern design data is performed based on a predetermined rule, it is also possible to supply such rule data to the user terminal 10 for performing the pattern design and also the mask design at the user terminal 10. In this case, the ISB server 12 verifies the pattern design data or the mask design data received from the user terminal 10. If no problems are found as a result of verification, the ISB server 12 transmits the mask data to the ISB mounting factory 14. If there are any problems, on the contrary, the ISB server 12 requests the user terminal 10 to reenter the data.

Further, generation of photo data in step S104 may be performed at the ISB server 12. Namely, the ISB server 12, rather than providing the mask data, may convert the mask data into photo data and send the obtained photo data to the ISB mounting factory 14 along with the part arrangement data and the wire bonding data.

Figure 4:
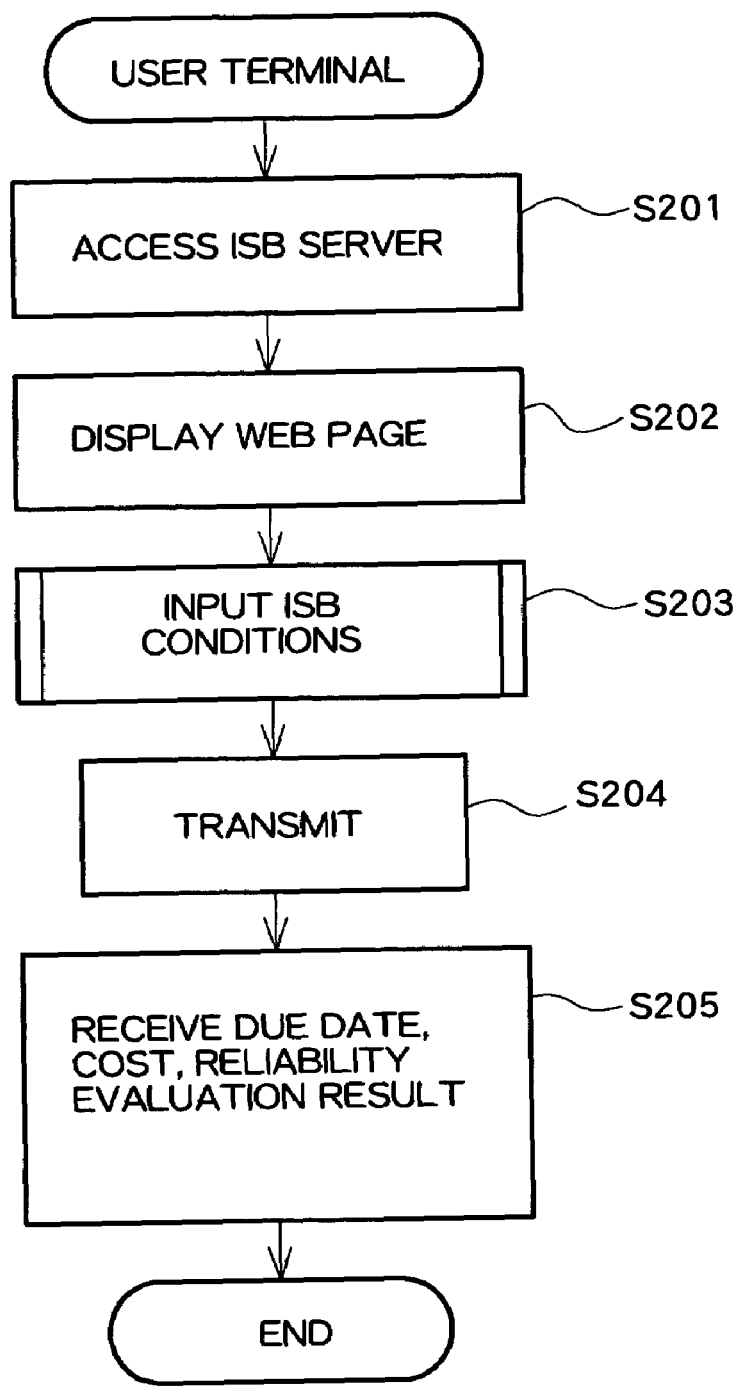
FIG. 4 is a process flowchart of a user terminal.

FIG. 4 shows a process flowchart at the user terminal 10. The user terminal 10, which is provided with a web browser, accesses the ISB server 12 using the TCP/IP protocol or the like (S201). The ISB server 12, in response to the access, transmits a created web page to the user terminal 10, which receives and displays the web page (S202). On this web page, various tools for allowing a user (a device manufacturer) to enter the specifications from the user terminal 10 are defined. A user inputs ISB specifications using the web page (S203), and transmits the input specifications to the ISB server 12 (S204). It should be noted that a web page has been described only as an illustrative example, and input and transmission of the specifications may be performed using a page described in HTML and also a page described in XML or the like.

The ISB server 12, based on the specifications received from the user terminal 10, obtains the due date and cost of the ISB and also a reliability evaluation result of an ISB to be manufactured according to the input specifications, and sends the result to the user terminal 10. The user terminal 10 receives and displays the result on a screen (S205). Here, the data concerning the due date and the cost, as well as the reliability evaluation results are sent and received in the form of web page data.

Figure 5:
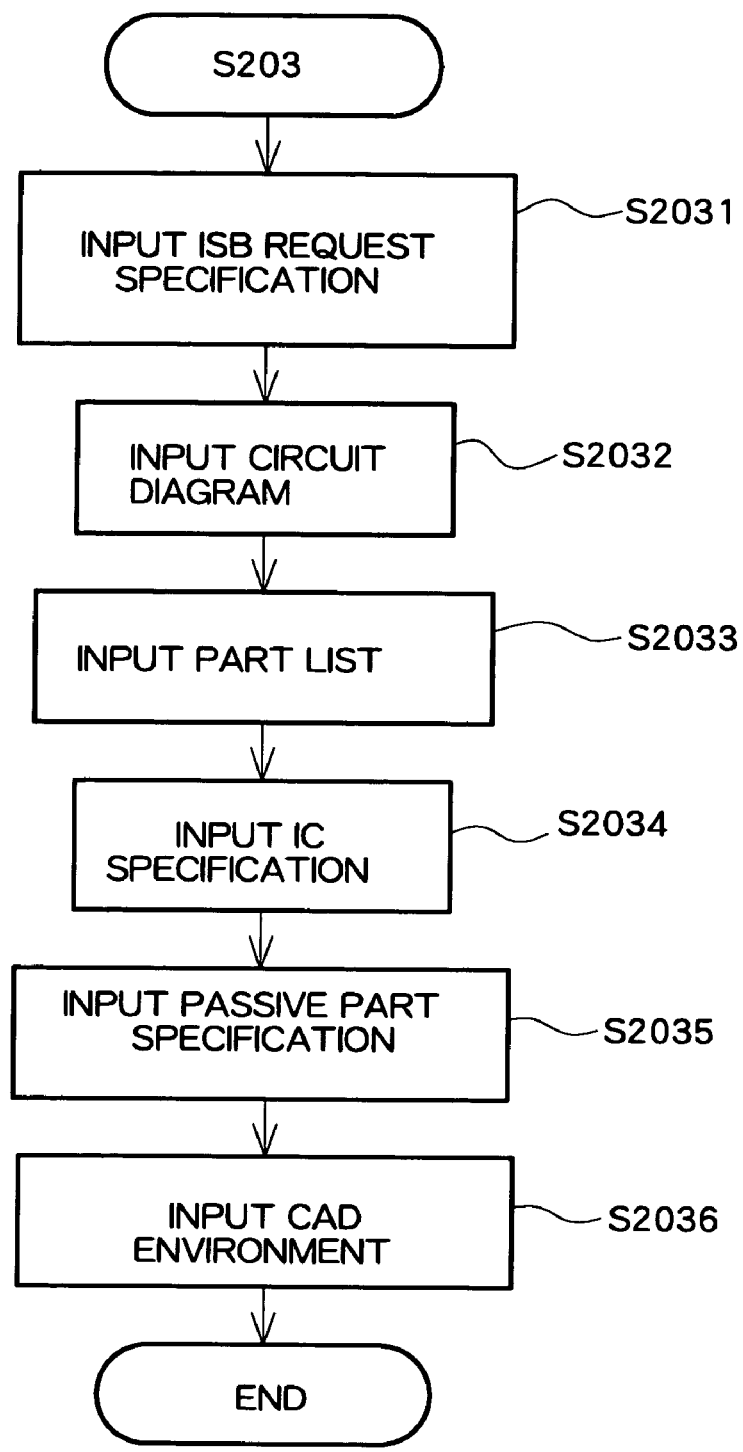
FIG. 5 is a detailed process flowchart of step S203 in FIG. 4.

FIG. 5 shows a specific flowchart of the process in step S203 of FIG. 4, namely the specifications input process. FIGS. 6 to 12 show example screens displayed on the user terminal 10.

Initially, the user inputs an ISB requirement specification as a specification (S2031). FIG. 6 shows an initial screen displayed on the user terminal 10 when a user accesses the ISB server 16 using the user terminal 10. An authentication process (input of ID or password) during accessing is well known and will not be described. Tabs are shown at the upper section of the screen such that the user can select one of "ISB specification requirement", "input circuit diagram", "input part list", "input IC specification", "input specification of passive part", "information of used CAD", and "confirmation of transmission content". Initially, the ISB specification requirement screen is displayed. The ISB specification requirement is a basic specification of an ISB desired by the user. Specifically, the ISB specification requirement includes a specification of the external form of the ISB, a specification of ISB terminal, a thermal discharge characteristic of ISB, a frequency characteristic of ISB, and package environment specifications. As the specification of the external form of the ISB, for example, the length, width, and height in mm units are input using appropriate keys. When the external form of the ISB is of a special shape, the user may attach a drawing file which is created in advance. As the specification of the ISB terminal, terminal size (terminal diameter) and inter-terminal pitch (center-to-center distance) are input using keys in units of mm. Similarly, when the ISB terminal has a special shape, a drawing file may also be attached. As the thermal discharge characteristic of the ISB, a thermal resistance is input using keys in units of $°$ C./W. As the frequency characteristic of ISB, a frequency is input using keys in units of GHz. The ISB requirement specification may further include the storage temperature and the operational environment temperature, which are input as the package environmental specifications. Further, reliability requirements, and references for these parameters, when such references exist, may be input.

Figure 7:
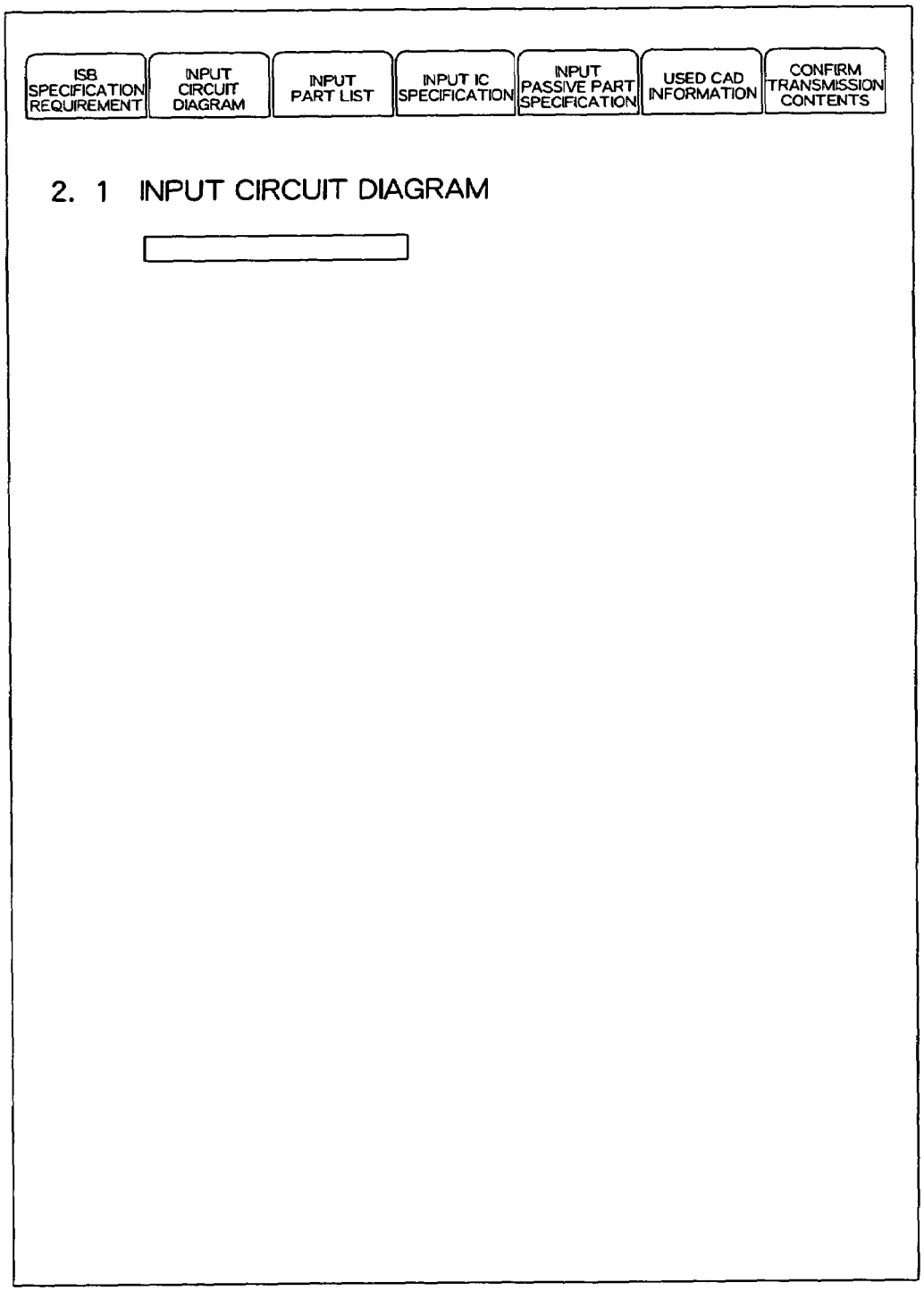
FIG. 7 is a diagram for explaining a screen displayed on a user terminal (part 2)

After the ISB requirement specification is input, a circuit diagram is input (S2032). FIG. 7 shows an example screen when the "input circuit diagram" tab is selected in FIG. 6. The user inputs CAD data of the circuit diagram on this screen. More specifically, the user attaches a file containing CAD data of the circuit diagram prepared in advance. For the CAD data of the circuit diagram, for example, a dxf format is used.

Figure 8:
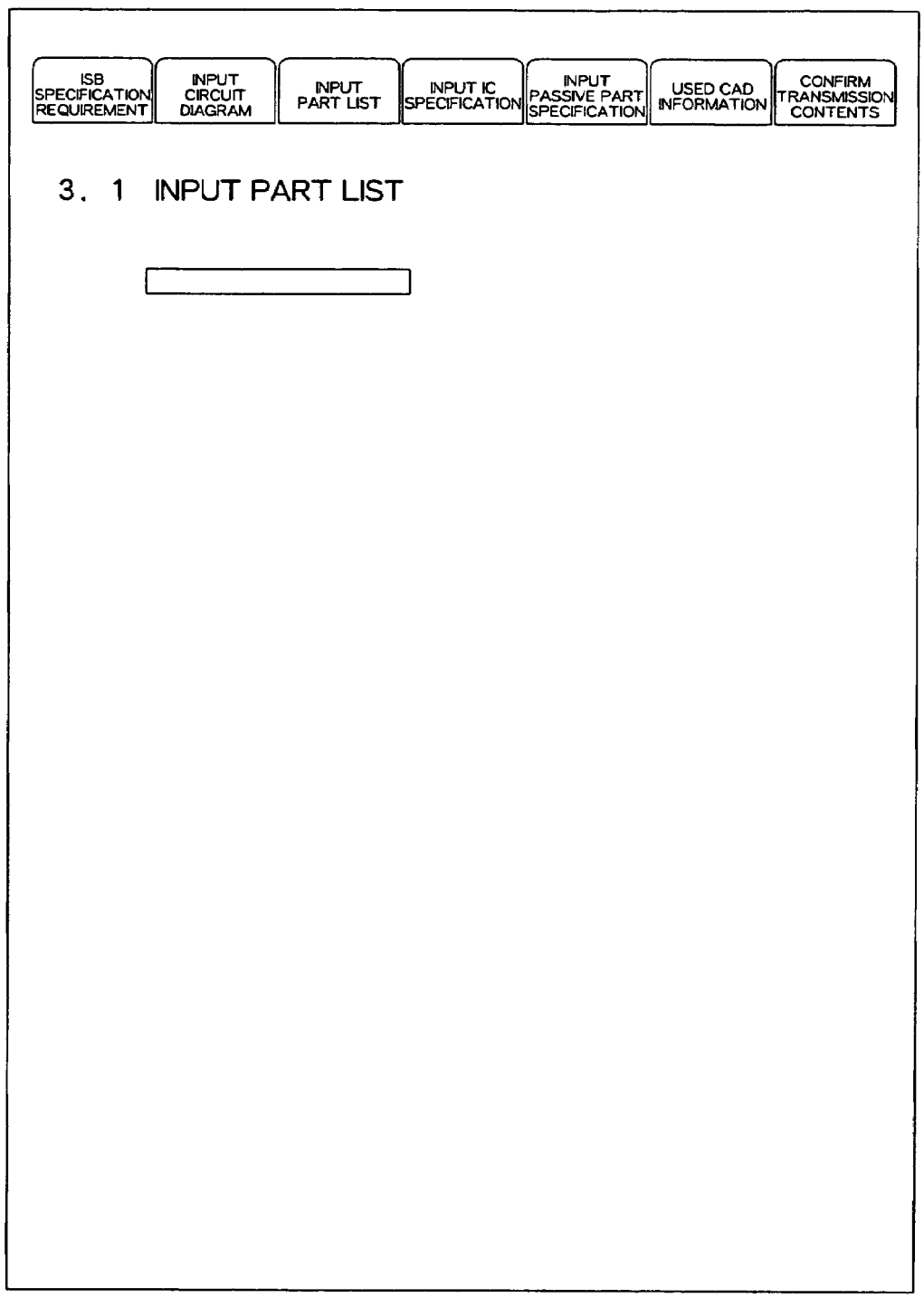
FIG. 8 is a diagram for explaining a screen displayed on a user terminal (part 3)

After the input of a circuit diagram, a part list is input (S2033). FIG. 8 shows an example screen when the user selects the "input part list" tab in FIG. 6. The user inputs the part list on this screen. The "parts" may include active parts such as an IC and an LSI and passive parts such as a chip CR. When the user has prepared a part list file in advance, the user attaches the list file. Although not shown in FIG. 8, it is also possible to create a "refer sample" button within the page and display a list of part data from the part manufacturers which are already registered in the database 18, when the user operates on the sample button to allow the user to create and input a part list by selecting parts from the part data list. For the part list, a document may be prepared in, for example, xls or pdf formats, or the document may be a Microsoft Word file.

Subsequent to the part list input, the IC specification is input (S2034). FIG. 9 shows an example screen when the user selects the "input IC specification" tab on FIG. 6. The IC specification includes information on the external size of an IC (including LSI) pellet, wire bonding pad information, information on the backside of the pellet, and other information. For the external size of the pellet, the user inputs the length, width, and height of the pellet using keys in units of mm along with the name of the pellet. It is also possible to distinguishingly input, when the size is input, depending on whether or not the street width is included. As the wire bonding pad information, the user inputs, using keys, the external size of the metal and size of the pad opening in units of mm along with the name of the pellet. It is also possible for the user to attach a file containing a list of pad coordinates. As the backside information of the pellet, the user inputs as to whether or not the backside of the pellet is floating, and the name of the pellet. As the other information, a drawing file of a metal mask drawing or a wiring bond drawing is input as an attachment file, when the user has such drawings.

After input of the IC specification, the passive part specifications are input (S2035). FIG. 10 shows an example screen when the user selects the "input passive part specification" tab on FIG. 6. The passive part specification includes the external size of the passive part, electrode terminal specification, and other information. For the external size of the passive part, the length, width, and height of the passive part are input using keys in units of mm along with the name of the passive part. For the electrode terminal specification, the length and width of the electrode shape are input in units of mm, along with the name of the passive part. It is also possible to distinguishingly input based on whether the electrode shape is quadrangle or circular. As the other drawing information, the user inputs as an attachment file drawings of the external shape of the part or of electrode of the part or specification on the electrical characteristic or the like, when the user has such information.

Subsequent to the input of the passive part specification, the CAD environment is input (S2036). FIG. 11 shows an example screen which is displayed when the user selects the "information on used CAD" tab on FIG. 6. The user inputs the usable CAD and file format on this screen. More specifically, the user selects the circuit designing CAD and usable substrate designing CAD. For the circuit designing CAD, for example, CR-5000, OrCAD, ACCEL, and others are displayed to allow the user to select from among these choices. It is also possible to input Gerber data or the like along with the selection.

When the input of all the data items is completed, the input specifications are transmitted from the user terminal 10 to the ISB server 12. Here, it is preferable to make final confirmation of the input items prior to transmission. FIG. 12 shows an example screen when the user selects the "confirm transmission content" tab on FIG. 6. The items input in each screen of FIG. 6–11 are displayed as a list and the user reviews this screen to ultimately confirm the transmission contents. When the transmission contents are acceptable, the user operates on the transmission button to transmit the specifications to be satisfied by the ISB to the ISB server 12.

Because the user terminal 10 receives the reliability evaluation result from the ISB server 12 after transmission of the specifications, the user terminal 10 may finally determine whether or not the ISB circuit device is to be ordered after confirmation of the reliability evaluation result. For example, an "order" button is displayed on a web page showing the reliability evaluation result, and the user operates this button to send the order data to the ISB server 12 when the user finally decides order of the device. The ISB server 12 may transmit the manufacturing data to the ISB mounting factory 14 after reception of the order data.

Figure 13:
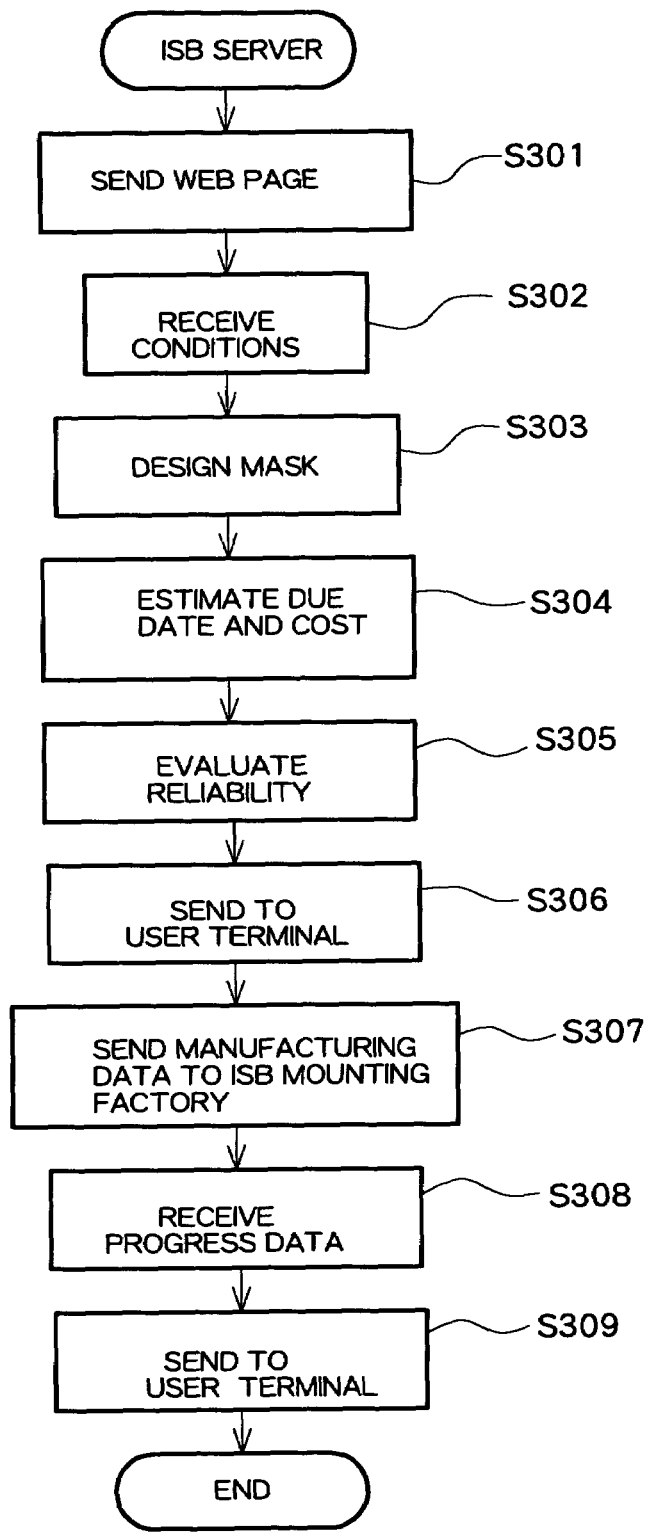
FIG. 13 is a process flowchart of the ISB server.

FIG. 13, on the other hand, shows a process flowchart for the ISB server 12. First, the ISB server 12 prepares a web page for entering specifications, and transmits the web page in response to a request from the user terminal 10 (S301). The ISB server 12 then receives the specifications transmitted from the user terminal 10 (S302), and designs a mask based on the specifications (S303). The ISB server 12 refers to the CAD data stored in the database when designing a pattern from the circuit diagram CAD data and designing a mask from the pattern. After designing the mask, the ISB server 12 estimates the due date and the cost for an ISB circuit device in question (S304), and further evaluates the reliability of the ISB circuit device (S305). Here, the reliability corresponds to the thermal discharge characteristics and the frequency characteristics of an ISB circuit device, and can be evaluated as a degree of achievement when the heat dissipation characteristics and the frequency characteristics are input from the user terminal 10 as the ISB specification. After obtaining the due date, cost, and reliability evaluation, the ISB server 12 returns this data to the user terminal 10 in a web page format (S306). The processes in the above steps S302 to S306 are carried out using CGI. By confirming the web page displayed on the user terminal 10, a user can see in advance whether or not an ISB circuit device has desired reliability or characteristics, based on which the user can determine whether or not to place a final order, as described above, or whether or not to enter new specifications. In a case where a user designs a pattern and also a mask through the user terminal 10 (in a case where a user inputs pattern data and mask data), return of such reliability evaluation is particularly effective.

The ISB server 12 transmits mask data obtained by mask design, the part arrangement data, and the wire bonding coordinate data to the ISB mounting factory 14 (S307). The ISB mounting factory 14 in turn manufactures an ISB circuit device based on the received manufacturing data while sequentially providing the progress information to the ISB server 12. The ISB server 12 receives the progress information transmitted from the ISB mounting factory 14 (S308), and then transmits the received progress information to the user terminal 10 in a web page format (S309).

Figure 14:
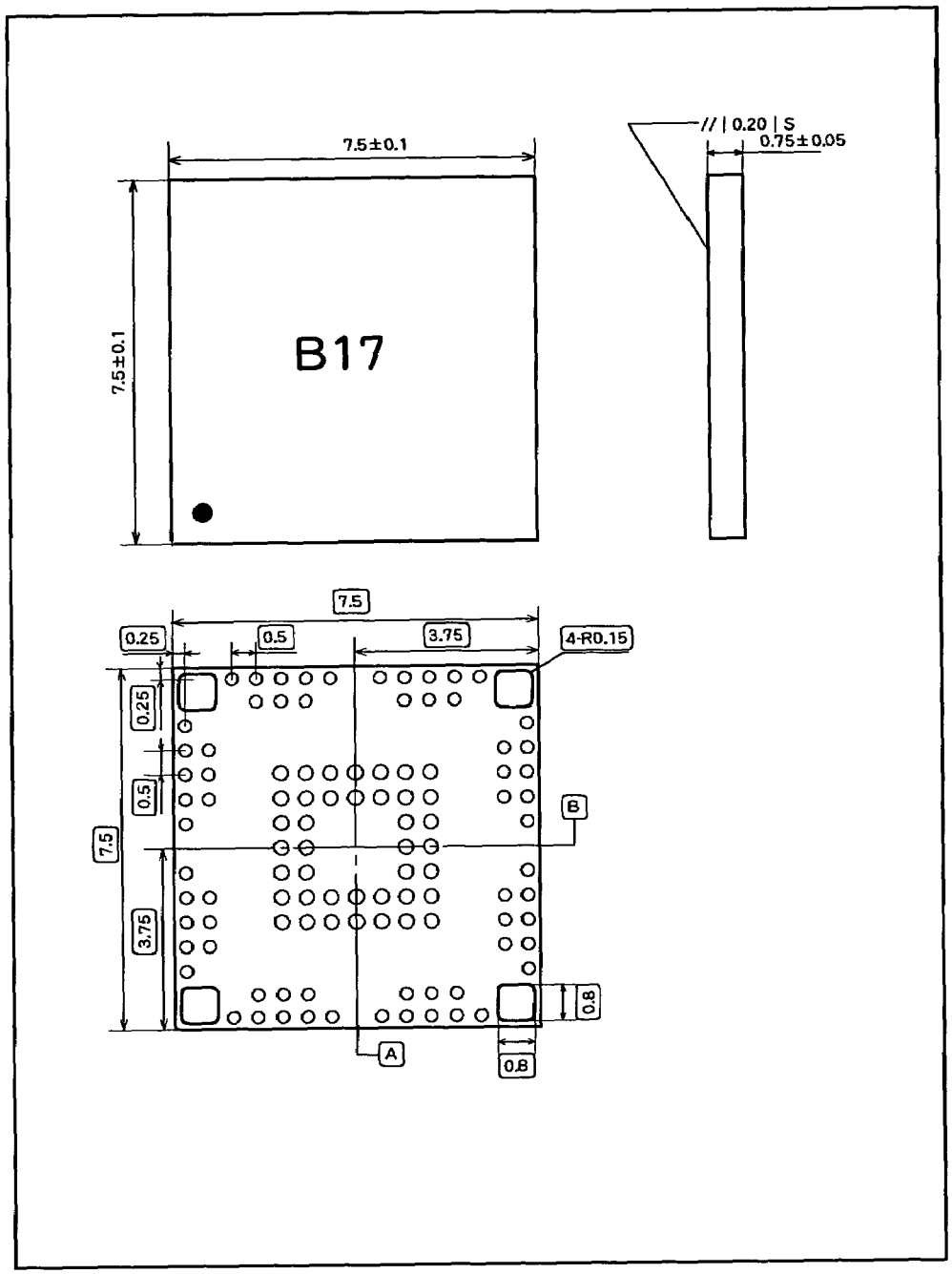
FIG. 14 is a diagram for explaining an external view.
Figure 15:
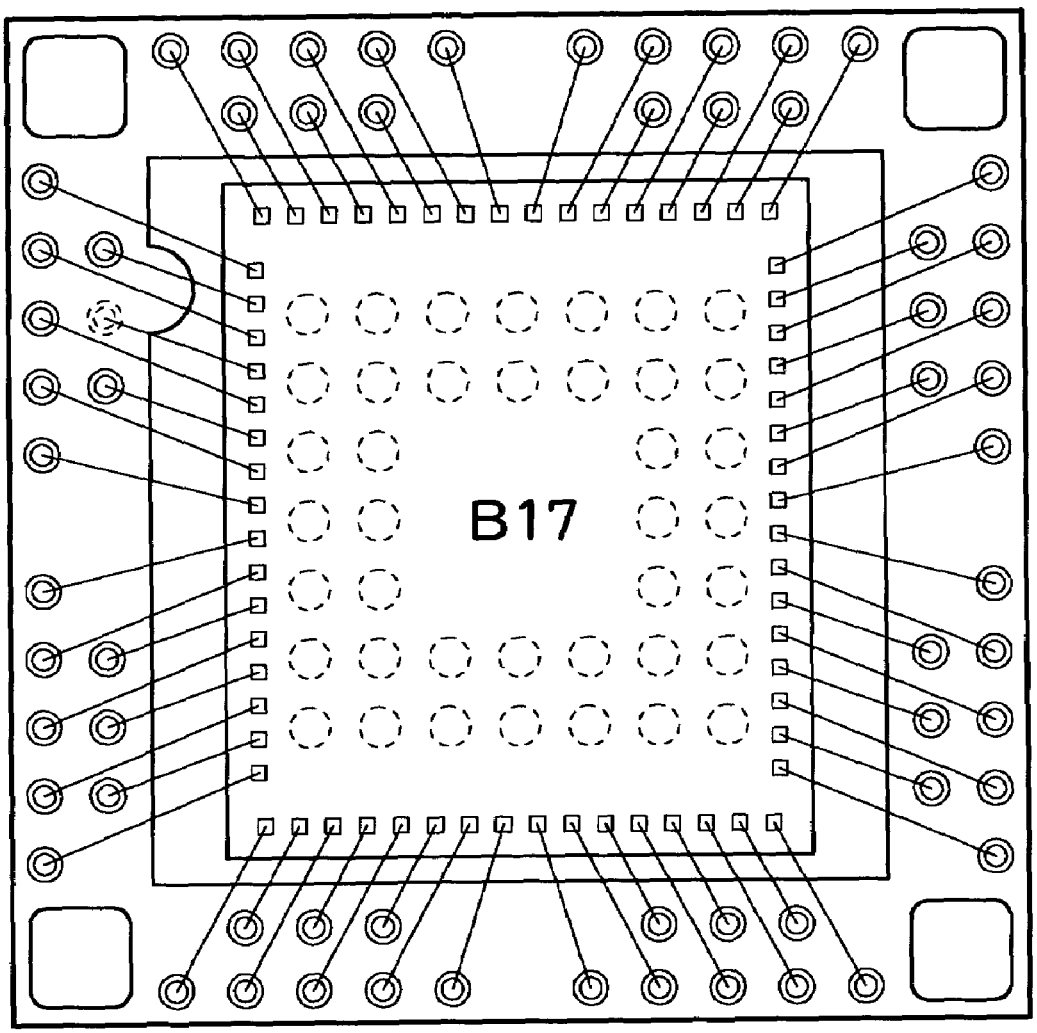
FIG. 15 is a pattern explanatory view corresponding to the external view of FIG. 14.

FIG. 14 shows an example external form diagram of an ISB circuit device which is input from the user terminal 10, and FIG. 15 is a pattern diagram prepared based on the external form diagram of FIG. 14.

Thus, according to the present embodiment, an ISB circuit device can be automatically manufactured and provided to a user, simply by inputting specifications to be satisfied by the ISB circuit device through the user terminal 10. Further, it is possible for a user to obtain data concerning reliability evaluation of the ISB circuit device before actually obtaining the ISB circuit device. Moreover, because the progress of manufacturing of an ISB circuit device can be confirmed on a web page, scheduling for manufacturing a set (a mobile telephone or an amplifier, various players, a digital camera, and so on) into which the ISB circuit device is to be incorporated can be facilitated.

While an embodiment of the present invention has been described, the present invention is not limited to the above embodiment, and various changes can be made.

For example, while in the above embodiment, a single user terminal 10 is connected to the ISB server 12, a plurality of user terminals 10 may be connected to the ISB server 12 via the Internet. In such a case, as the specification data and the circuit diagram data transmitted from the user terminal 10 of a device manufacturer and the reliability evaluation data are stored in the database of the ISB server 12, it is possible to make this data browsable for reference materials, which are available when circuit design is performed by another device manufacturer. More specifically, by allowing a user to select whether or not specifications input by the user from a certain user terminal 10 and data concerning an ISB circuit device to be manufactured based on the input specifications are disclosed when the user inputs these specifications, when the user selects disclosure of the data, these specifications may be provided in response to an access request from another user terminal 10.

ISB circuit devices include, in addition to those having a single layer structure in which wiring is provided in one layer, those having a multi-layered structure in which wiring is provided in two or more layers. Therefore, it is also preferable that the ISB server 12 determine whether an ISB circuit device would be configured to have a single layer structure or a multi-layered structure based on the specifications input from the user terminal 10 and performs pattern design and mask design. In general, a single layer structure has superior thermal discharge characteristics, while a multi-layered structure is generally more capable of high density mounting. Thus, according to one determination standard, is it possible to select a single layer structure when the thermal discharge characteristics are emphasized, and a multi-layered structure when the external size of an ISB circuit device is emphasized.

While a preferred embodiment of the present invention has been described using specific terms, such description is for illustrative purposes only, and it is to be understood that changes and variations may be made without departing from the spirit or scope of the appended claims.

What is claimed is:

1. A method of manufacturing a circuit device, using a terminal and a server which are connected to each other via a communication network, wherein the circuit device is an System in Package (SIP) circuit device or an Intergrated System in Board (ISB) circuit device in which a plurality of semiconductor chips, a passive part, and a wiring are two-dimensionally placed, are electrically connected to each other, and are covered with an insulating resin, wherein the method comprises:
 a condition inputting step for inputting conditions including a condition of whether or not the circuit device is of a single layer structure or of a multilayer structure as conditions to be satisfied by the circuit device through the terminal and transmitting the conditions from the terminal to the server;
 a manufacturing data generating step for receiving the input conditions from the terminal and generating, at the server, manufacturing data for manufacturing the circuit device based on the conditions; and
 a manufacturing step for manufacturing the circuit device based on the generated manufacturing data.

2. The method according to claim 1, further comprising:
 an evaluating step for evaluating, at the server, reliability of a circuit device to be manufactured based on the conditions when the conditions are received by the server and transmitting an evaluation result to the terminal.

3. The method according to claim 1, wherein
 the conditions include at least an external size, a terminal size, a circuit diagram, IC specification data, and passive part specification data of the circuit device, and
 in the manufacturing data generating step, a pattern design processing and a mask design processing are performed based on the conditions for generating, as the manufacturing data, at least mask data, parts placement data, and wire bonding coordinate data.

4. The method according to claim 1, wherein
 in the condition inputting step, the conditions are input through a web page which is created by the server and displayed on the terminal.

5. A method of manufacturing a circuit device using a terminal and a server which are connected to each other via a communication network, wherein the circuit device is an System in Package (SIP) circuit device or an Intergrated System in Board (ISB) circuit device in which a plurality of semiconductor chips, and a wiring are two-dimensionally placed, are electrically connected to each other, and are covered with an insulating resin, wherein the method comprises, at the server, the steps of:
 receiving conditions including a condition of whether or not the circuit device is of a single layer structure or of a multilayer structure as conditions to be satisfied by the circuit device from the terminal;
 generating manufacturing data for manufacturing the circuit device based on the conditions; and
 transmitting the generated manufacturing data to a circuit device manufacturing facility, and the circuit device is manufactured using the manufacturing data in the circuit device manufacturing facility.

6. The method according to claim 5, wherein
 the conditions include at least an external size, a terminal size, a circuit diagram, IC specification data, and passive part specification data of the circuit device, and
 the manufacturing data includes at least mask data, part arrangement data, and wire bonding coordinate data.

7. The method according to claim 5, further comprising, at the server, the steps of:
 evaluating reliability of a circuit device to be manufactured based on the conditions; and
 transmitting a reliability evaluation result to the terminal.

* * * * *